N. E. BRIGHAM.
MANUFACTURE OF CONFECTIONS OF THE COATED TYPE.
APPLICATION FILED MAY 20, 1919. RENEWED NOV. 28, 1921.
1,417,446.
Patented May 23, 1922.
2 SHEETS—SHEET 1.
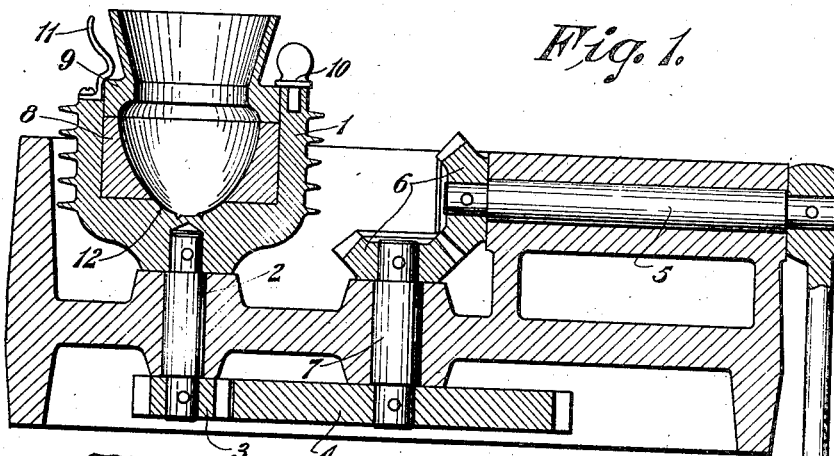
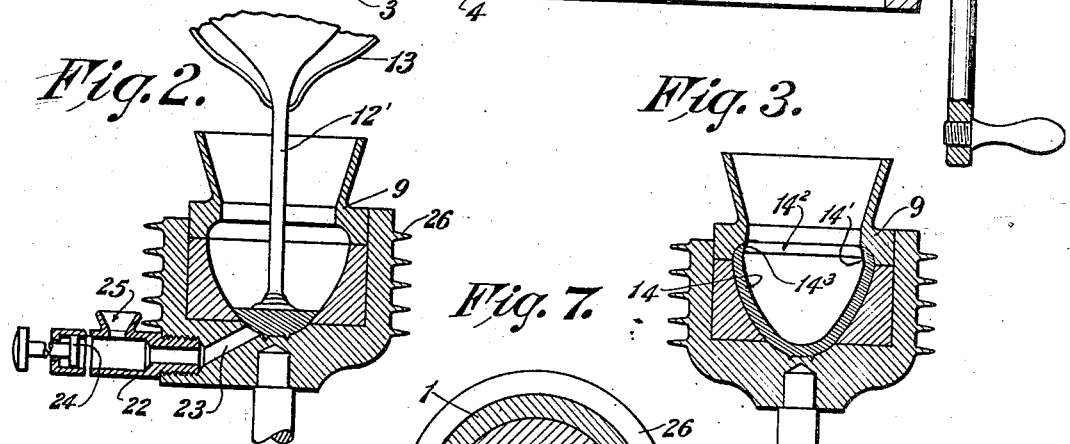
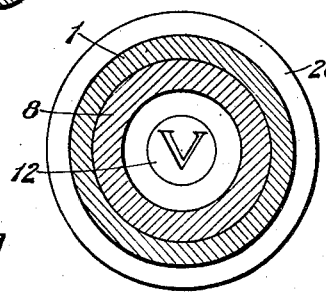
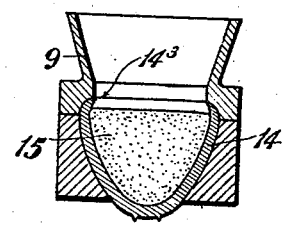
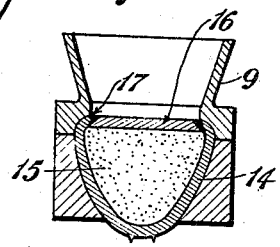
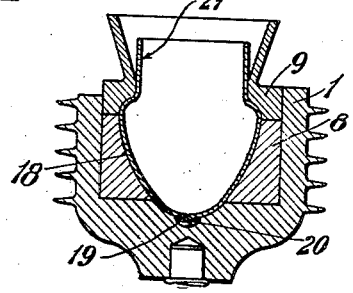
WITNESS:
B. F. Seaver.
INVENTOR.
Nelson E. Brigham,
BY Harry W. Bowen.
ATTORNEY.

N. E. BRIGHAM.
MANUFACTURE OF CONFECTIONS OF THE COATED TYPE.
APPLICATION FILED MAY 20, 1919. RENEWED NOV. 28, 1921.
1,417,446.
Patented May 23, 1922.
2 SHEETS—SHEET 2.
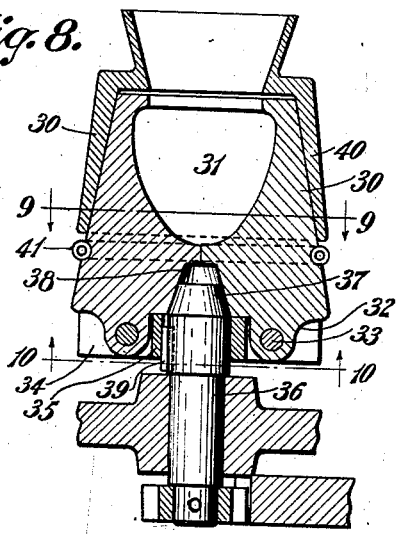
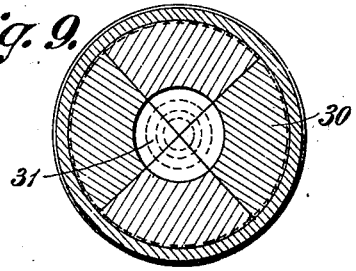
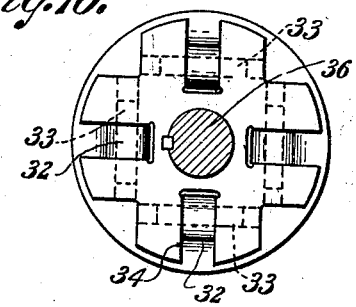
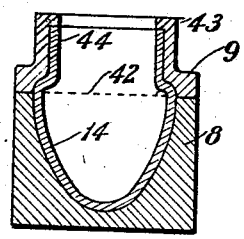
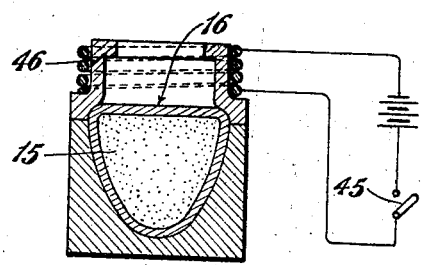
WITNESS:
INVENTOR.
Nelson E. Brigham,
BY
Harry W Bowen.
ATTORNEY.

UNITED STATES PATENT OFFICE.

NELSON E. BRIGHAM, OF HOLYOKE, MASSACHUSETTS, ASSIGNOR TO CONOID CANDY MACHINE COMPANY, OF SOUTH HADLEY FALLS, MASSACHUSETTS, A COPARTNERSHIP, CONSISTING OF HENRY M. CHASE AND NELSON E. BRIGHAM.

MANUFACTURE OF CONFECTIONS OF THE COATED TYPE.

1,417,446.  Specification of Letters Patent.  Patented May 23, 1922.

Application filed May 20, 1919, Serial No. 298,513. Renewed November 28, 1921. Serial No. 518,433.

*To all whom it may concern:*

Be it known that I, NELSON E. BRIGHAM, a citizen of the United States of America, residing in Holyoke, county of Hampden, and Commonwealth of Massachusetts, have invented certain new and useful Improvements in the Manufacture of Confections of the Coated Type, of which the following is a specification.

This invention relates to improvements in the manufacture of confections, and more particularly of chocolate creams. It is a common practice at the present time, in the manufacture of this class of confection, to first mold the creams or cores by pouring the cream into depressions made in starch, the depressions being formed by means of suitable molds. After the cores or creams have hardened, they are then flooded with or dipped in chocolate, which forms the coating. They are then allowed to cool and are then ready for packing.

Broadly stated, the present invention relates to the method of and apparatus for partially forming the coating of a confection, then filling the partially formed coating with the filling material and finally closing the coating or completing the confection. The means that I have devised for carrying out this process comprises a rotatable member or mold having a suitably shaped depression therein whereby when the coating is in a semi-liquid or melted state and at a suitable temperature is introduced into the depression of the mold and rotated at a suitable speed, the coating material will be forced up the inner walls of the depression, by the combined action of gravity and centrifugal force. The member is then brought down to a suitable speed of rotation or the rotation stopped if desired, it being assumed that the coating material has then set or cooled sufficiently to receive the filling material. The filling material is now introduced, after which the remaining portion of the coating is added, and, after uniting with the previously formed partial coating thus forming the complete confection.

Reference is made to the drawings forming a part of the application to the detailed description and claims which will specifically point out the improvement.

Fig. 1 illustrates, in section, a machine having means for rotating the mold into which the coating material is introduced.

Fig. 2 shows the coating material being introduced into the mold and also illustrates a modification in which the coating material if desired, may be forced into the bottom part of the member or mold.

Fig. 3 shows the coating material having been forced up the inside of the mold and set sufficiently for the introduction of the filling material.

Fig. 4 shows the partially formed coating filled with the filling material.

Fig. 5 shows the remaining portion of the confection closed with the addition of a suitable coating material.

Fig. 6 is a modification in which the inside of the mold is provided with a paper lining or other suitable material into which the coating material is introduced, whereby when the confection is completed, it is wrapped and covered.

Fig. 7 indicates the idea of forming the mold with a design.

Fig. 8 is a modification in which the mold is formed in sections with means for holding the sections together and suitable means for opening the sections of the mold after the confection is completed.

Fig. 9 is a horizontal sectional view on the line 9—9 of Fig. 8 showing the sections.

Fig. 10 is a sectional plan view on the line 10—10 of Fig. 8 showing the plate to which the sections are pivoted and the plunger for rotating and opening the mold.

Fig. 11 is a further modification illustrating the mold when stationary and showing the coating after the bowl has been rotated to throw the surplus coating material up the sides.

Fig. 12 shows the coating material after being melted to complete the confection.

Referring to the drawings in detail: 1 indicates a rotatable member, which is secured or attached to the shaft 2, that carries, at its lower end, the pinion 3 which meshes with the gear 4, operated from the shaft 5 through the gears 6 and shaft 7. Mounted in the member 1 is a mold member 8 and mounted on the upper end of the mold-member 8 is a plate 9 that is attached to the bowl 1 by means of the thumb screw 10 and latch 11. The lower part of the bowl 1 is also formed with a curve and merges into the curved surface of the members 8 and 9 as indicated at 12.

Referring to Fig. 2, 12' indicates the semi-liquid or melted coating material introduced into the mold from the receptacle 13 before or during the rotation of the mold. This coating material is introduced at the proper temperature. As the member is rotated at a constant or variable rate of rotation, the coating material will be forced up the inner surface of the mold to form a thin layer of the coating material indicated in Fig. 3 at 14. This act of being forced up the inner surface is a well known principle in physics and mechanics, and as shown in Fig. 3 the coating material may be considered as having set forming a partial coating for the finished confection. The upper part of the coating being indicated at 14', leaving an opening $14^2$ at this part of the confection with the thin edge as shown at $14^3$.

Referring to Fig. 4, which illustrates the filling material of the confection at 15, after the same has been introduced into the partially formed coating shown in Fig. 3, it being understood that the mold is now being held stationary, or driven at a low rate of rotation, the next step in the manufacture of the confection is completing the remaining portion of the coating of the confection as indicated at 16 in Fig. 5. This is accomplished by adding a suitable coating material to the filling 15, the edges of the part 16 adhering to or uniting with the edges $14^3$ of the already formed coating 14 as indicated at 17 of the opening $14^2$ of the coating.

If desired, the bottom of the mold 8 may be formed with a suitable engraved symbol as shown in Fig. 7 with the letter "V", to indicated that the confection is of vanilla flavor. When the coating sets the "V" is distinctly shown. Other designs may be shown.

Referring to Fig. 6, 18 designates a lining of paper or other suitable material that is first inserted in the molds 8 and 9, or other holding means, the material if paper being first preferably twisted together as indicated at 19, the twisted portion being received in the opening 20 of the bowl 1. After the confection is formed in the manner already described, the upper part 21 of the casing is folded inward, thus completely enclosing the confection, whereby when the molds 8 and 9 are separated, the confection will be wrapped thus producing a sanitary article.

Referring to Fig. 2 in which a pump is indicated at 22 for forcing the coating material into the bottom part of the mold through the opening 23, 24 being the plunger and 25 the opening through which the coating material is poured into the pump. It is obvious that the molds may be made of any suitable material, the object being to provide a material to which the confection will not adhere when set, in order to permit the easy removal of the finished confection. The bowl 1 is shown with cooling fins 26 for the purpose of rapidly conducting the heat away from the molds 8 and 9.

Referring to Figs. 8 and 9, 30 designates the sections of a mold, four of which are shown, in which the inner portion of the sections are cut out to form the depression 31 into which the coating material is placed. The lower end of the sections are formed with depending projections 32 through which are passed pivotal pins 33 for attaching the sections to the plate 34. This plate is formed with an integral collar 35 through which passes the driving shaft 36 that is formed with a tapered upper surface 37 which surface fits a correspondingly shaped opening 38 at the lower part of the sections 30. The shaft 36 is keyed to the plate 34 as indicated at 39. This key is formed with a sliding fit to permit the shaft 36 to be raised, or the mold lowered, whereby when the cap 40, which holds the sections together, is removed the sections can be forced apart by the tapered surface of the shaft 36 and the confection readily removed. The coiled spring 41 serves to draw the sections together again, as readily understood.

Referring to Fig. 11, in which it is to be understood the mold 8 is first filled with the coating material up to the line 42, it is then rotated and the surplus coating material may be thrown off from the top edge 43 of the funnel 9 by centrifugal force, leaving a coating which covers the inside of the mold 8 and also covering the inside of the funnel 9 as shown at 44.

The filling material 15 is now introduced as shown in Fig. 12. The switch 45 is now closed to allow an electric current to flow through the heating coil 46 for melting the coating material 44 on the inside of the funnel 9, which will flow or run downward onto the filling 15 and form the closing or base part 16 of the coating of the confections. The mold is now opened by means of the construction shown and described in connection with figures 8, 9, and 10.

It is to be understood that mold 8 of my improvement is not limited to any particular shape as the recess instead of being in the form shown may be of any suitable shape. When the mold is rotated the inner surface of the coating or lining of the confection will, of course, assume the shape of a parabola, irrespective of the shape of the recess into which the coating material is introduced.

What I claim is:

1. The method of forming coated confections of the chocolate cream type, in which a coating is first formed by inserting the material into a mold, then rotating the mold, to cause the material to be forced up the inner surface of the same to form part of the coating of the confection, next stopping the rotation of the mold and introducing the filling material, next completing the coating of the confection by adding material on to the filling material and allowing it to unite with the coating first formed whereby the coating is completed and the filling is completely encased.

2. The method of forming a confection which consists in introducing the material which is to form the coating into a mold, then rotating the mold which operation results in forming a lining on the interior of the same with the material when in a plastic or melted condition and allowing the same to set during the rotation of the mold, thus forming a partial coating for the confection, then introducing the filling material and finally completing the coating by adding an additional quantity of a coating material.

3. The method of forming a confection which consists in introducing a coating material into a revolving receptacle said substance, by the combined action of centrifugal force and gravity will conform to the contour of the receptacle to form a partial coating for the confection when the same has set, next introducing the material which forms the filling of the confection into the partially formed coating and finally closing the partial coating.

4. The method of making a confection which consists in introducing into a revolving receptacle, a suitable substance which substance, by the combined action of centrifugal force and gravity will coat the inner surface of the receptacle and form a partial coating for a confection, next introducing the filling material and finally completing the coating by adding a coating material.

5. In a machine for forming confections, the combination with a member having a depression to receive the confection forming substance, means for rotating the same to cause the substance to form a partial coating on the inner surface of the member, means for filling the partial coating and means for completing the coating, as described.

6. In a machine for making confections of the coated type, the combination of a member for receiving a coating material of a confection, means for rotating the member to cause the coating material to spread and form a coating in the member, means for filling the coating, means for heating a portion of the coating material for completing the confection.

7. The method of forming confections of the coated type, which consists in introducing a coating material, into a receptacle, rotating the same to cause the surplus material to be thrown off by the action of centrifugal force, the remaining portion of the substance forming a partial coating of the confection, next introducing the filling material and finally completing the confection.

8. The method of forming a confection which consists in introducing the material which is to form the coating into a mold, then rotating the mold which operation results in forming a lining on the interior of the same with the material when in a plastic or melted condition and allowing the same to set during the rotation of the mold thus forming a partial coating for the confection, then introducing the filling material.

NELSON E. BRIGHAM.